Oct. 18, 1927.

H. STUKART 1,645,551

BREAD SLICER

Filed Jan. 8 1923      5 Sheets-Sheet 1

INVENTOR.
Hendrik Stukart
By Nissen & Crane ATTYS

Oct. 18, 1927.

H. STUKART 1,645,551

BREAD SLICER

Filed Jan. 8, 1923

INVENTOR:
Hendrik Stukart
By Nissen & Crane
ATTYS.

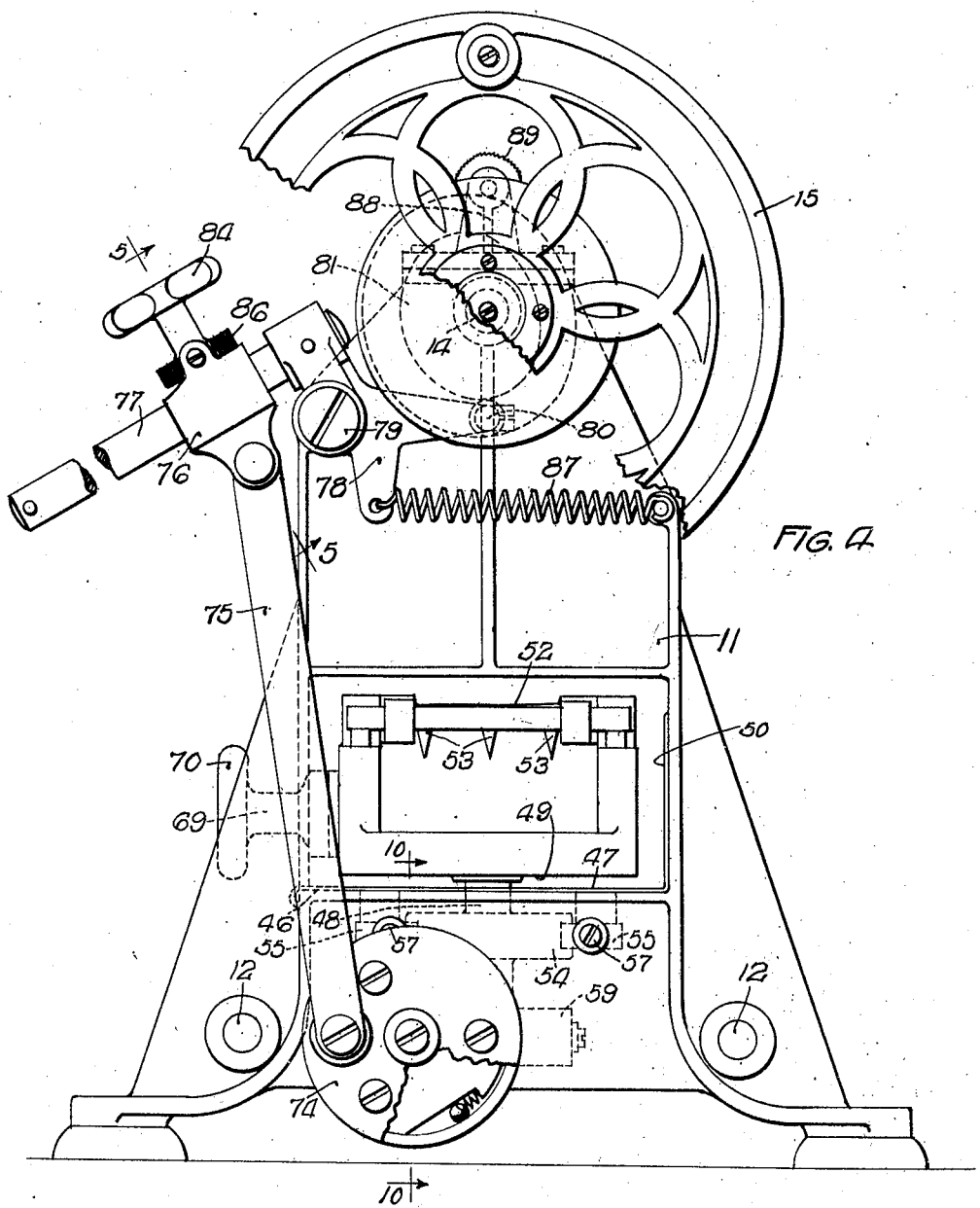

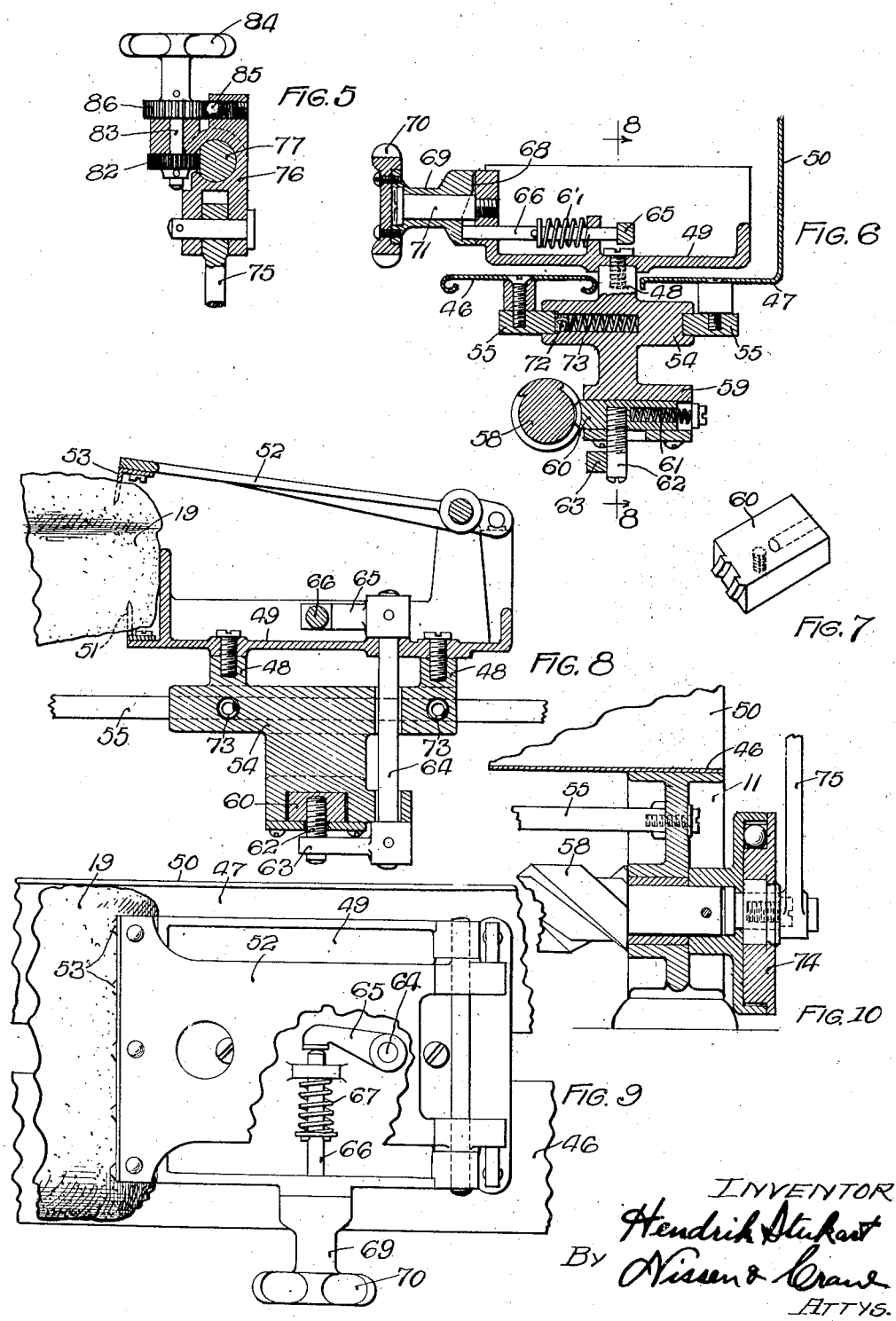

Patented Oct. 18, 1927.

1,645,551

UNITED STATES PATENT OFFICE.

HENDRIK STUKART, OF LA PORTE, INDIANA, ASSIGNOR TO U. S. SLICING MACHINE COMPANY, OF LA PORTE, INDIANA, A CORPORATION OF INDIANA.

BREAD SLICER.

Application filed January 8, 1923. Serial No. 611,217.

This invention relates to a machine for slicing bread and similar commodities and has for its object the provision of a device of the class named which shall be of improved construction and convenient and efficient in operation.

The invention is exemplified in the combination and arrangement of parts shown in the accompanying drawings and described in the following specification, and it is more particularly pointed out in the appended claims.

In the drawings—

Fig. 4 is an elevation looking from the right in Fig. 1, with parts broken away;

Fig. 5 is a section on line 5—5 of Fig. 4;

Fig. 6 is a section on line 6—6 of Fig. 1;

Fig. 7 is a perspective view showing a detail of construction;

Fig. 8 is a section on line 8—8 of Fig. 6;

Fig. 9 is a top plan view of the holding clamp with part broken away; and

Fig. 10 is a section on line 10—10 of Fig. 4.

Figure 1:
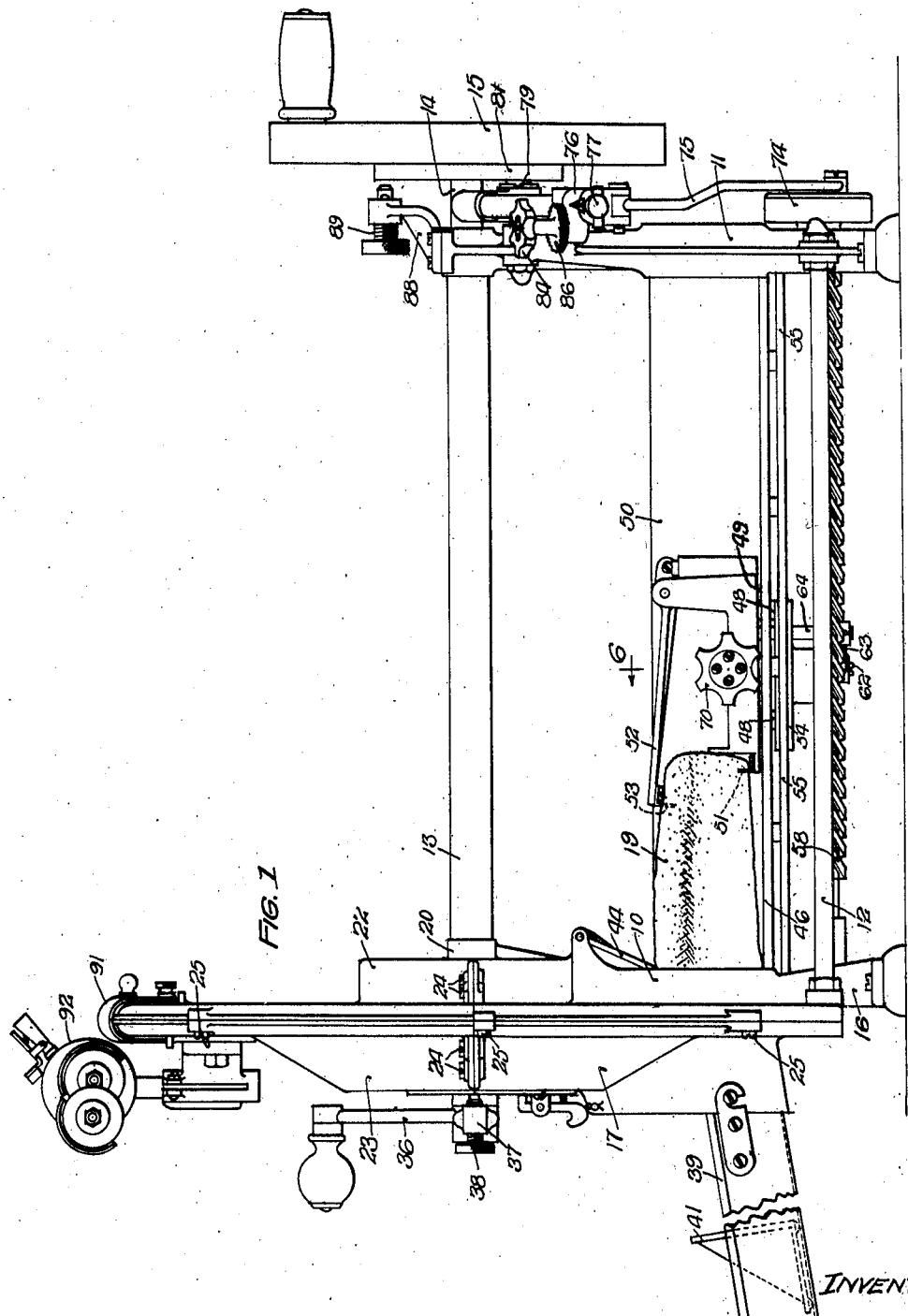
Fig. 1 is a side elevation of a bread slicing machine showing one embodiment of the present invention.
Figure 2:
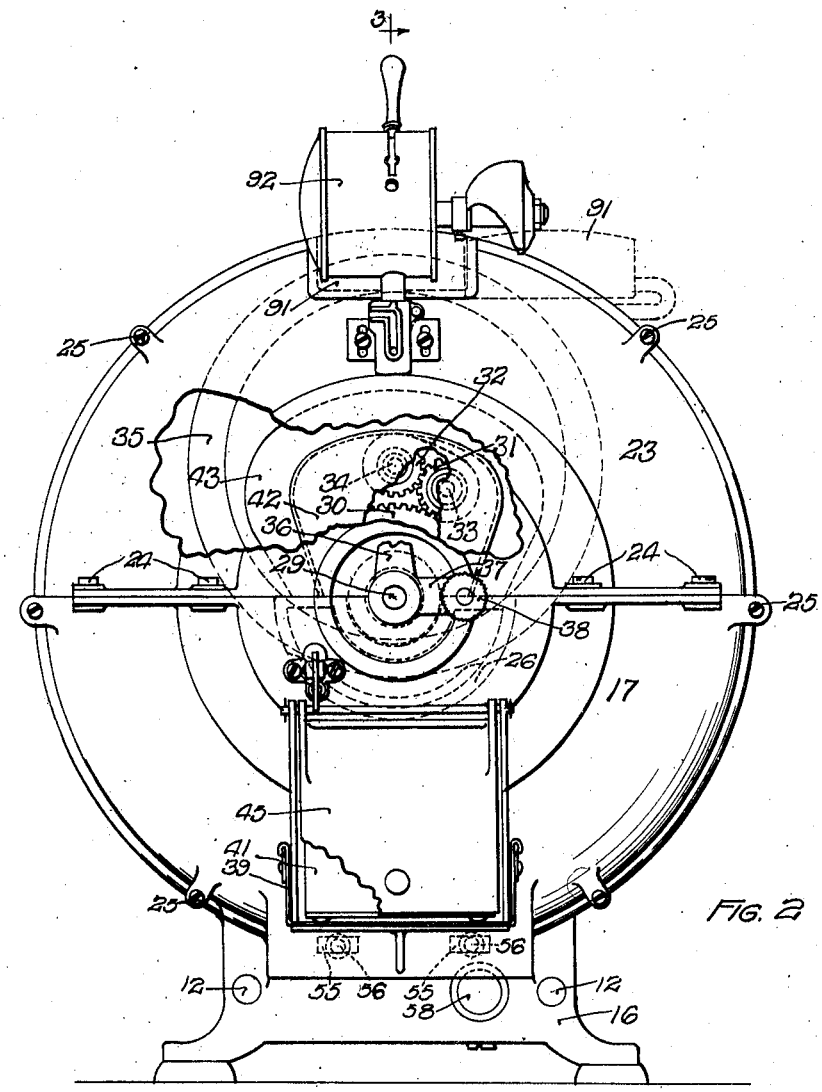
Fig. 2 is a front elevation of the device shown in Fig. 1, with parts broken away.
Figure 3:
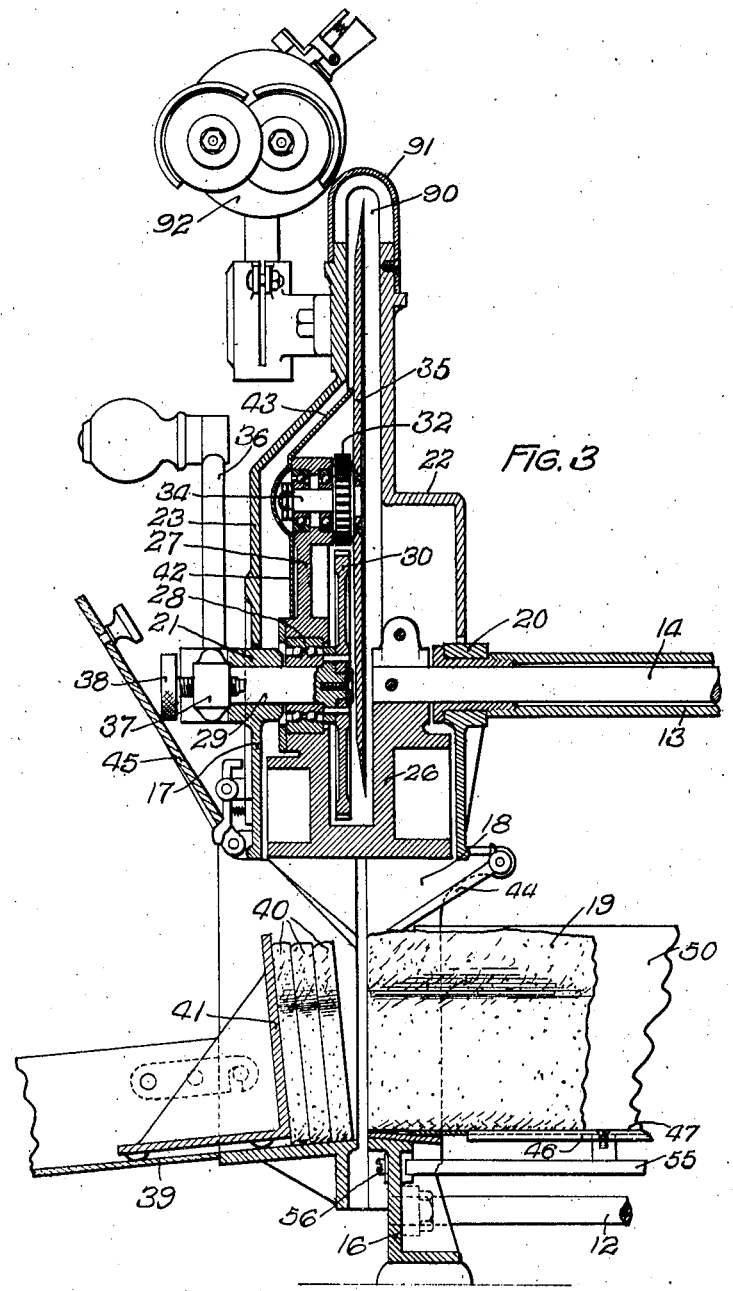
Fig. 3 is a vertical section substantially on line 3—3 of Fig. 2.

In the embodiment illustrated the front casing 10 and a rear frame 11 are connected by spacing bars or rods 12 near the base of the machine and by a hollow rod 13 through which the drive shaft 14 extends, the drive shaft being connected to a hand wheel 15 at the rear of the machine. The front casing comprises a rear member 16 and a front member 17 secured thereto, the two members being provided with an opening 18 through which the loaf of bread 19 or other article to be sliced is fed. The members 16 and 17 are provided with bearings 20 and 21, respectively, and the upper portion of the front housing is formed by plates 22 and 23 secured to the members 16 and 17 by cap screws 24 and connected to one another by screws 25. Either or both of the plates 22 and 23 may be removed to provide easy access to the interior of the front housing.

Secured to the forward end of the shaft 14 within the front housing is a U-shaped member 26, the front leg of which is provided with an arm 27 journaled to rotate upon a roller bearing 28 which is in turn mounted upon a stud shaft 29 journaled in the bearing 21. The stud shaft 29 is provided with a spur gear 30 rigidly fixed thereto and the arm 27 carries a pair of intermeshing pinions 31 and 32 secured to stud shafts 33 and 34, respectively, journaled in roller bearings carried by the arm 27. The stud shaft 34 has rigidly fixed thereto a rotary disc knife 35 while the pinion 31 meshes with the gear 30. The forward end of the stud shaft 29 carries a hand crank 36 and an arm 37 having a thumb screw 38 threaded therein. The screw 38 when advanced through the arm 37 enters an opening in the front casing to prevent rotation of the shaft 29 and thus holds the gear 30 against movement. When the gear 30 is thus locked rotation of the shaft 14 will cause the knife 35 to travel in an orbit about the axis of the shaft 14 and the planetary gears 31 and 32 will be driven by the stationary gear 30, thus rotating the knife 35 upon its axis at the same time that it revolves in its orbit. This will bring the knife periodically past the opening 18 to sever slices from the loaf 19 and at the same time the rotation of the knife will produce a draw-cut making it possible to slice all kinds of bread smoothly and without mutilation. In front of the throat 18 there is provided an inclined runway 39 for receiving the slices 40, there being an abutment member 41 slidably mounted in the runway to retain the slices in upright position.

The abutment member 41 may be substantially at right angles to the bottom of the runway 39 and yet the inclination of the runway will permit sufficient inclination of the slices to prevent their falling backwardly at the rear of the stack. An enclosing plate 42 is carried by the arm 27 and forms with the knife 35 a casing for the planetary gearing. The outer portion 43 of the plate 42 is arranged at an angle to the face of the knife 35 so that as the slices are cut this inclined portion of the enclosing plate will engage the slices and advance them along the runway 39 so that they are prevented from dropping back into the path of the slicing knife. A spring-pressed plate 44 engages the top of the loaf 19 to hold it firmly while the slices are being cut and a hinged cover 45 may be provided for the front of the throat, which cover can be closed when the machine is not in use. It will be noted that the inclined bottom of the chute 39 makes it possible for the slices to retain the exact relation to one another that they had before they were cut so that the longitudinal space occupied by the slices is less than would be required if they were given the same inclination on a horizontal runway. In many places the longitudinal space allotted to a machine is of considerable importance as counter space in many stores is limited and this inclination of the receiving runway not only assists in feeding the slices from the slicing position without their falling back into the path of the knife, but also results in economy of space.

The loaf to be sliced is supported on plates 46 and 47 which are spaced from one another, as shown in Fig. 6, to provide a central slot through which supporting lugs 48 for the bread clamp 49 extend. The plate 47 is provided with an upright back wall 50 but the front of the runway for the loaf is open, permitting ready access thereto. The bread clamp 49 is provided with teeth 51 for penetrating the loaf and a spring clamp 52 has cooperating teeth 53 for engaging the top of the loaf. The lugs 48 are carried by a slide 54 which travels on guide rails 55 connected by screws 56 and 57 to the front and rear frame members, respectively. The slide 54 is fed along the rails 55 by a feed screw 58 having its ends journaled in the front and rear frames. As will be seen from Fig. 6 the feed screw 58 is located at one side of the center line of the slideway so that it is not directly beneath the central slot along which the lugs 48 pass. Crumbs or other particles falling through the central slot will not be intercepted by the feed screw 58 which otherwise might be clogged by such particles.

Depending from the slide 54 is a block 59 having a toothed member or half nut 60 slidably mounted therein in position to engage the threads of the screw 58. A spring 61 normally holds the half nut in engagement with the feed screw. A pin 62 projects downwardly from the half nut in the path of a finger 63 secured to a rod 64. The upper end of the rod 64 is provided with a finger 65 which bears against the end of a plunger 66. The plunger 66 is held in its retracted position by a spring 67 and may be advanced by a cam 68 formed on the face of a sleeve 69 having a hand wheel 70 secured thereto, the sleeve being rotatably mounted on a stud 71 carried by the gripper 49. When the hand wheel 70 is rotated the half nut 60 will be retracted freeing the gripper from the screw 58 so that it may be freely moved along the runway for the bread. The slide 54 is provided with friction plugs 72 which bear against the inner face of one of the rails 55, the plugs being pressed against the rails by springs 73. As the bread clamp is fed forwardly by the screw 58 the friction plugs 72 will take up the back lash between the screw 58 and the half nut 60 and will prevent any overthrow of the feed clamp at the end of the rotation of the screw, thus insuring uniform movement of the bread clamp at each operation of the screw. The screw 58 is rotated by a ball ratchet 74 shown in Fig. 10. The operating member of the ball ratchet is reciprocated by a link 75 connected at its upper end to a sleeve 76 slidably mounted on a rod 77. The rod 77 is connected to a bell crank 78 pivoted at 79 on the rear frame of the machine and provided with a roller 80 which bears on a cam 81 secured to the main drive shaft 14. The feeding operation may be varied by moving the sleeve 76 along the rod 77 and for this purpose the rod is provided with rack teeth meshing with a pinion 82 secured to a pin 83 having a hand wheel 84 connected therewith. A ball ratchet 85 bears against a toothed wheel 86 secured to the hand wheel 84 to hold the hand wheel and sleeve 76 in its various positions of adjustment along the rod 77. A spring 87 is connected with the bell crank 78 to hold the roller 80 in contact with the cam 81.

Mounted on the rear frame is a bracket 88 having a thumb screw 89 threaded therein which may be advanced into an opening in the hand wheel 15 to prevent rotation of the drive shaft 14. When the drive shaft is thus locked the arm 27 will be held from rotation with the spindle 34 of the knife 35 in its uppermost position. If the thumb screw 38 is released while the drive shaft is thus locked the knife 35 may be rotated about a fixed axis by means of the hand crank 36. The upper edge of the knife 35 extends into an opening 90 having a removable cover 91. When the cover is removed the knife sharpener 92 may be brought into contact with the knife 35 so that the edge of the knife may be sharpened while it is driven by the hand crank 36. Any suitable form of sharpener 92 may be employed, the form illustrated being similar to that described in Patent No. 1,390,210, granted to me September 24, 1912.

I claim:—

1. A slicing machine having a slideway for the material to be sliced provided with a centrally disposed slot in the bottom thereof, a follower for advancing material along said slideway, supporting means for said follower extending through said slot, a guide for said supporting means beneath said slideway and at one side of said slot, and a feed screw positioned beneath said slideway and at one side of said slot.

2. In a slicing machine, a slideway for material to be sliced having a centrally disposed longitudinal slot therein, a follower movable along said slideway, a guide for said follower beneath said slideway at one side of said slot, and feeding means for said follower located beneath said slideway and at one side of said slot so that particles falling through said slot will not lodge upon said feeding means.

3. In a slicing machine, a slideway for material to be sliced having a longitudinal slot therein, guide rails positioned beneath said slideway, a follower movable along said slideway, a support for said follower mounted to travel along said guide rails, connecting means carried by said support and extending through said slot for securing said follower to said support, a feed screw located beneath said slideway at one side of said slot, and a toothed member connected with said support for engaging said feed screw.

4. A bread slicing machine comprising a slicing knife, a follower for feeding bread to said knife, a guide for said follower, a friction device mounted on said follower and having a friction surface in sliding engagement with said guide, and a spring for resiliently pressing said device against said guide during forward movement of said follower for restricting movement of said follower to insure accurate operation thereof.

5. A slicing machine comprising a knife, a support for material to be sliced, means for feeding material along said support, an elongated guide for said feeding means, mechanism for imparting intermittent movement to said feeding means, and a continuously acting resistance member mounted on said feeding means and engaging said guide for opposing movement of said feeding means to prevent overthrow thereof at the end of a feeding operation.

6. In a slicing machine, a feed member, a pair of guide rails upon which said member travels, a friction device carried by said member and bearing against one of said guide rails and a spring arranged to hold said friction device against said guide rail during forward movement of said device.

7. In a bread slicing machine, a rotary knife, a guideway for a loaf to be sliced, a follower movable along said guideway, a pair of rails for supporting said follower arranged at opposite sides thereof, and a spring-pressed friction member carried by said follower and arranged to press against one of said rails.

8. In a bread slicing machine, a slicing knife, a guideway for a loaf of bread, a follower movable along said guideway, a screw for imparting intermittent movement to said follower, a pair of rails for supporting said follower arranged at opposite sides thereof, a friction member carried by said follower, and a spring for pressing said friction member outwardly against one of said rails.

9. A bread slicing machine comprising a knife, a guideway for a loaf of bread having a longitudinal slot therein, a follower for moving a loaf along said guideway, a support for said follower arranged beneath said guideway, a pair of rails upon which said support is slidably mounted, a feed screw located beneath said guideway at one side of said slot, and a spring-pressed resistance member carried by said support and arranged to bear upon one of said rails.

10. A bread slicing machine comprising a knife, a slideway for a loaf of bread, a follower for feeding a loaf on said slideway, a support for said follower beneath said slideway, a feed screw for said support, a toothed member for engaging said feed screw, and means mounted on said follower for moving said toothed member into and out of engagement with said feed screw.

11. In a slicing machine, a knife, a guideway for material to be sliced having a longitudinal slot therein, a follower movable along said guideway, a feed screw for said follower positioned beneath said guideway at one side of said slot, a toothed member connected with said follower and arranged to engage said feed screw, an operating handle for said toothed member mounted on said follower, and connecting means for said handle and toothed member extending through said slot.

12. A slicing machine comprising a feed screw, a ratchet wheel for operating said feed screw, a reciprocating lever for actuating said ratchet wheel, means for connecting said lever and ratchet wheel, a rotary member for shifting the point of connection of said ratchet wheel with said lever, and means for retaining said shifting means in its various positions of adjustment.

13. In a slicing machine, a feed screw, a ratchet wheel for operating said feed screw, a reciprocating lever, a sleeve mounted to slide upon said lever, means for connecting said sleeve to said ratchet wheel, rack and pinion mechanism for moving said sleeve along said lever, and a ball ratchet for retaining said sleeve in its various positions of adjustment.

14. A slicing machine comprising a disc knife, means for rotating said knife about the axis of said disc and for revolving said knife about an axis eccentric to the axis of said disc, and a casing for said knife divided along a horizontal plane passing substantially through said eccentric axis, the upper portion of said casing being divided along a substantially vertical plane to permit removal of the said upper portion in front and rear sections without disturbing the operating mechanism for said knife.

15. The combination with a bread slicing machine, of a receiver for slices formed thereby, said receiver being inclined downwardly from the point at which slices are formed, and a movable abutment in said receiver for retaining slices substantially at right angles to the bottom of said receiver.

16. In a bread slicer, a knife for severing slices from a loaf, an inclined receiver for said slices, an abutment member for retaining the slices in position inclined to the vertical in said receiver, and means for inclining the slices away from the knife as they are formed and for moving the slices along said receiver away from said knife.

17. In a bread slicing machine, a slicing knife, a chute for receiving slices formed by said knife, said chute being inclined downwardly from the point at which the slices are formed, an abutment member at substantially right angles to the bottom of said chute and movable along said chute, and a wedging device movable with said knife for forcing the slices away from said knife when they are formed.

In testimony whereof I have signed my name to this specification on this 4th day of January, A. D. 1923.

HENDRIK STUKART.